April 28, 1931.                M. ROMERA                    1,802,536
                          AGRICULTURAL IMPLEMENT
                          Filed May 21, 1929        2 Sheets-Sheet 1
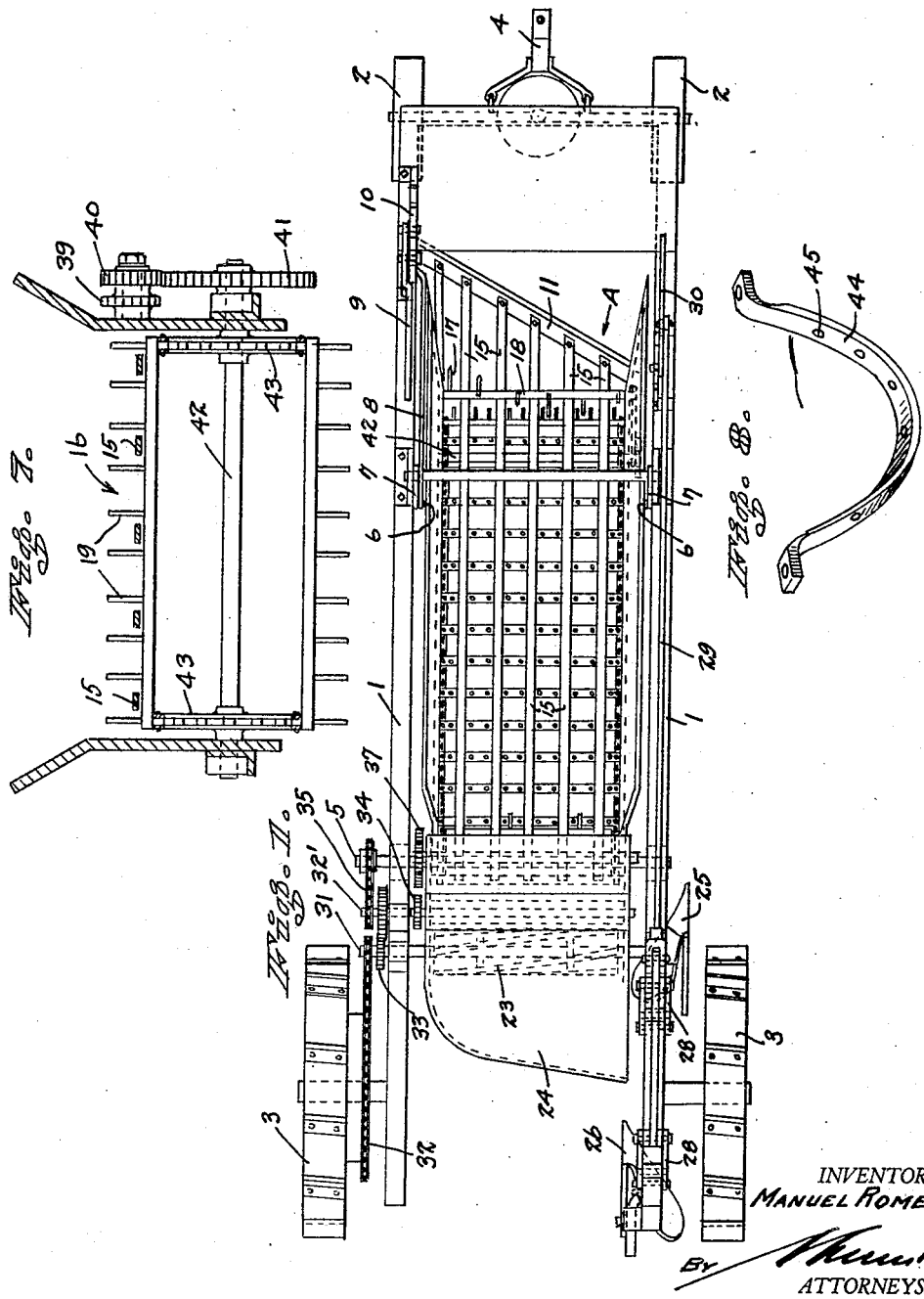
INVENTOR.
MANUEL ROMERA
ATTORNEYS.

April 28, 1931.  M. ROMERA  1,802,536
AGRICULTURAL IMPLEMENT
Filed May 21, 1929   2 Sheets-Sheet 2
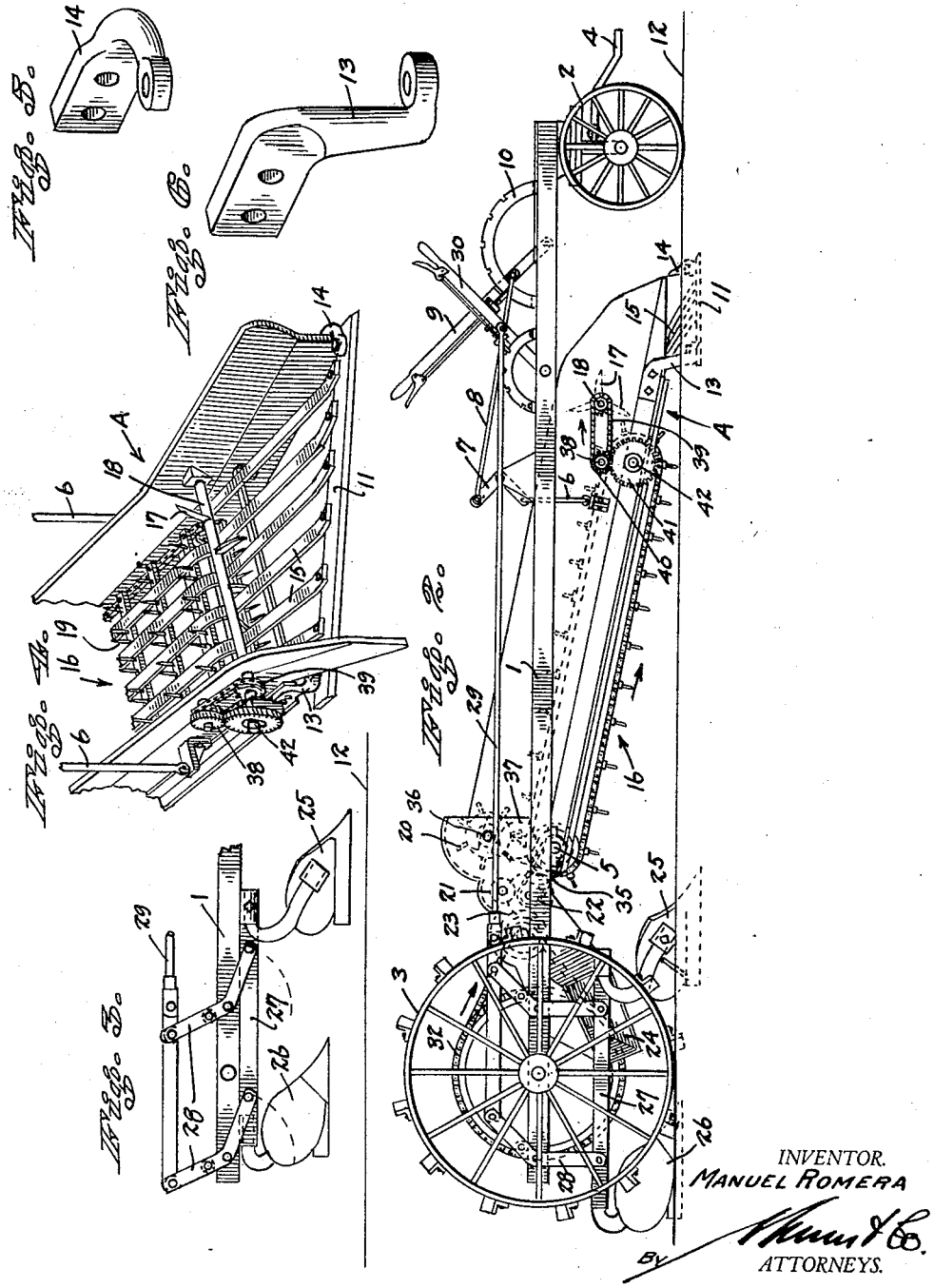
INVENTOR.
MANUEL ROMERA
BY
ATTORNEYS.

Patented Apr. 28, 1931

1,802,536

UNITED STATES PATENT OFFICE

MANUEL ROMERA, OF CASTROVILLE, CALIFORNIA

AGRICULTURAL IMPLEMENT

Application filed May 21, 1929. Serial No. 364,870.

My invention relates to improvements in agricultural implements, and it consists in the combinations, constructions and arrangements hereinafter described and claimed.

It is customary to cut the artichoke plants down to the roots each year and then to let the new plants grow from the old roots. This is done every year until about the fourth year, when the entire plant is dug up, roots and all. It is necessary in cutting the plants from the roots to cut about two inches below the surface of the ground. At the present time, this is done by hand, and then it is necessary to cut all of the artichoke plants and heap them together in one large pile. The artichokes are then left to dry, after which they are burned.

The principal object of my invention is to provide a machine which will cut the artichokes the necessary two inches below the surface of the ground, and then will cut the plants into small particles, after which the cut pieces are dropped back upon the ground. In this way the cut plants can be used as a fertilizer for the ground, because they will soon rot and will disintegrate back into the soil.

If desired, a trench may be drug by the machine, and the cut plants dropped into the trench. The device also has means for covering the trench over with dirt. A different kind of cutting blade is used when the entire plant and roots are removed.

In a co-pending application on an agricultural implement Serial No. 443,449 filed April 11, 1930, I show a device for cutting artichokes into small pieces, shaking the dirt from these pieces, and then dropping the pieces upon the ground where they will act as fertilizer. In the present form of the invention I show, in addition to the features just mentioned, a device for forming a trench for receiving the cut artichokes, after which the trench is covered over.

Other objects and advantages will appear as the specification proceeds, and the novel features will be particularly pointed out in the claims.

My invention is illustrated in the accompanying drawing, in which—

Figure 1 is a top plan view of the device;
Figure 2 is a side elevation;
Figure 3 is a side view of a portion of the device;
Figure 4 is a perspective view of another portion of the device;
Figures 5 and 6 are perspective views of other parts of the device;
Figure 7 is a transverse section through the conveyor; and
Figure 8 is a perspective view of one of the knives.

In carrying out my invention, I provide a frame 1 which is supported by front wheels 2 and rear wheels 3. The front wheels are used for guiding the frame, and are connected to a tongue 4 to which a tractor may be applied if desired.

The frame 1 carries a conveyor indicated generally at A (see Figure 2). This conveyor is pivotally supported by a shaft 5 that in turn is journaled in the frame 1. The front end of the conveyor is raised or lowered by means of a link 6, a bell crank lever 7, a link 8, and a locking lever 9 that is swingable over a notched semi-circular member 10. When the device is in operative position, the front end of the conveyor A is lowered so as to dispose a cutting knife 11 approximately two inches below the surface 12 of the ground. Figure 1 shows how the knife extends at an angle with respect to the direction of movement, and Figure 4 shows how the knife is secured to the conveyor A. The left hand end of the knife in Figure 4 is supported by a bracket 13 of the shape shown in Figure 6, while the right hand end is supported by a bracket 14 of the shape shown in Figure 5. It will be seen from this construction that as the device is advanced over the field the knife will sever the artichoke plants at a point approximately two inches below the surface of the ground. It is obvious that the device may be used for cutting other plants if desired. I have found that a slanting knife will make a more efficient cut than one which extends at right angles to the direction of movement.

The cut plants are dropped upon laths 15 that are secured to the knife 11 and extend back to an endless spiked feeder indicated generally at 16. The movement of the device will cause the cut plants to ride up on the laths and onto the spiked feeder. Just before the plants reach the feeder 16, they pass under cutting knives 17 that are carried by a shaft 18. These knives cut up the large plants into smaller parts.

Figure 4 clearly shows the feeder 16 as being provided with prongs 19 that engage with the plants for carrying them with the feeder. It will also be noted from Figure 4 that the feeder has open spaces through which the dirt can drop back onto the ground.

The plants are conveyed back to a spiked drum or roller 20 which cooperates with the feeder 16 for forcing the plants between two rolls or feed rollers 21 and 22 (see Figures 1 and 2). These last two rolls force the plants into a cutter 23, and the latter drop them into a chute 24 that in turn conveys them back to the ground.

If desired, a plowshare 25 may be lowered into the ground for digging a trench in which the cut plants are dropped. This plowshare can be followed by a second plowshare 26 that will cover up the trench with dirt. In Figure 3 I have shown the plowshares 25 and 26 as being mounted upon a bar 27 that in turn is carried by bell crank levers 28. The levers are connected to a rod 29 that may be moved into adjusted position by a locking lever 30 (see Figure 2). Figure 3 shows the plowshares 25 and 26 disposed above the ground 12, while Figure 2 shows them in operative position.

It is best now to describe how the different parts are connected together so as to operate when the device moves over the ground. The cutter 23 is mounted upon a shaft 31 (see Figure 1), and this shaft may be rotated by any means such as, for example, a chain and sprocket 32, that drives off from one of the rear wheels 3. The shaft 31 is turned in the direction of the arrow shown in Figure 2, and this rotates a shaft 32' that carries the lower roller 22. Gears 33 operatively connect the shafts together. The upper roller 21 is connected to the lower one 22 by gears 34. The lowermost gear 34 is mounted on the shaft 32' and is driven by this shaft.

The shaft 5 is connected to the shaft 32' by a chain and sprocket 35 (see Figure 1). The shaft in turn carries sprockets upon which the endless conveyor belt 16 is mounted. The shaft 5 is also operatively connected to a shaft 36 carrying the spiked roller 20 by means of gearing 37, which include an idler gear (see Figure 2). The shaft 18 is operatively connected to a shaft 38 (see Figure 2) by means of a chain and sprocket 39. In Figure 7 I show one of the sprockets 39 as being integral with a gear 40 that in turn is rotated by a gear 41 that is mounted upon a shaft 42. The shaft 42 also carries the front sprockets 43 of the feeder 16. It will be seen from this construction that all of the parts are operated by the wheel 3, and that they are rotated in the proper direction for carrying the plants from the knife 11 and discharging them in small pieces through the chute 24.

From the foregoing description of the various parts of the device, the operation thereof may be readily understood.

The machine is moved across the field and will cut the plants below the surface of the ground. These plants will be conveyed back to the cutter and then will be dropped back upon the ground by means of the chute 24. If the operator wishes to bury the cut pieces, he can drop the plowshares 25 and 26 into operative position. The device will save the time now consumed in stacking the plants in high piles and allowing them to dry before setting fire to them. The field will be perfectly level and smooth after the device has been moved over it.

If the operator wishes to remove the plants by their roots, a knife 44 of the shape shown in Figure 8 is used in place of the knife 11. The laths 15 will be connected to the knife 44 by inserting bolts through the laths and into openings 45 in the knife. The laths will lift the entire plant with its roots upon the endless spiked feeder 16, and the same operation will be repeated as when cutting the plants a slight distance below the ground.

Although I have shown and described one embodiment of my invention, it is to be understood that the same is susceptible of various changes, and I reserve the right to employ such changes as may come within the scope of the invention as claimed.

I claim:

1. An agricultural implement comprising a frame movable over the ground, a conveyor adjustably carried by said frame, a knife carried by said conveyor and being designed to cut plants at a point below the surface of the ground, a cutter, said conveyor carrying the cut plants to the cutter, means for discharging the plants after they have passed through the cutter, a member carried by said frame for digging a trench for receiving the plants from the discharge means, a second member for covering the plants with earth, and means for adjusting both members.

2. An agricultural implement comprising a frame movable over the ground, a conveyor for carrying plants and having openings for permitting dirt to drop from the plants onto the ground, a knife for cutting the plants, a cutter disposed between the knife and the conveyer for cutting the plants as they move onto the conveyor, a second cutter disposed at the opposite end of the conveyor, and a discharge chute communicating with the second cutter.

3. An agricultural implement comprising a frame movable over the ground, a conveyor carried by said frame and having openings therein for permitting dirt to fall therethrough, a knife disposed at the front of the conveyor and being inclined with respect to the direction of movement of the frame, means for adjusting the conveyor for causing the knife to cut the plants beneath the surface of the ground, a cutter disposed between said knife and said conveyor for cutting the plants and for feeding them onto the conveyor, a pair of feed rollers disposed at the opposite end of the conveyor, a spiked drum cooperating with the conveyor for feeding the plants to the rollers, a second cutter for receiving the plants from the rollers, and a discharge chute communicating with the second cutter.

4. An agricultural implement comprising a frame movable over the ground, a conveyor carried by said frame and having openings therein for permitting dirt to fall therethrough, a knife disposed at the front of the conveyor and being inclined with respect to the direction of movement of the frame, means for adjusting the conveyor for causing the knife to cut the plants beneath the surface of the ground, a cutter disposed between said knife and said conveyor for cutting the plants and for feeding them onto the conveyor, a pair of feed rollers disposed at the opposite end of the conveyor, a spiked drum cooperating with the conveyor for feeding the plants to the rollers, a second cutter for receiving the plants from the rollers, a discharge chute communicating with the second cutter, a trench-digging member disposed adjacent to the discharge chute, and a second member for covering the trench with dirt.

5. An agricultural implement comprising a frame movable over the ground, a conveyor carried by said frame and having openings therein for permitting dirt to fall therethrough, a knife disposed at the front of the conveyor and being inclined with respect to the direction of movement of the frame, means for adjusting the conveyor for causing the knife to cut the plants beneath the surface of the ground, a cutter disposed between said knife and said conveyor for cutting the plants and for feeding them onto the conveyor, a pair of feed rollers disposed at the opposite end of the conveyor, a spiked drum cooperating with the conveyor for feeding the plants to the rollers, a second cutter for receiving the plants from the rollers, a discharge chute communicating with the second cutter, a trench-digging member disposed adjacent to the discharge chute, a second member for covering the trench with dirt, and means for moving said members into operative or inoperative positions.

MANUEL ROMERA.